United States Patent [19]

Kramer et al.

[11] Patent Number: 4,468,056
[45] Date of Patent: Aug. 28, 1984

[54] SWIVEL

[75] Inventors: James H. Kramer, Akron; Roy L. Orndorff, Jr., Kent, both of Ohio; James M. Stephens, Grandview, Mo.; Vincent T. Presutto, Barberton, Ohio

[73] Assignee: The B. F. Goodrich Company, N.Y.

[21] Appl. No.: 308,865

[22] Filed: Oct. 5, 1981

[51] Int. Cl.³ .............................................. F16L 27/00
[52] U.S. Cl. ..................................... 285/281; 285/168
[58] Field of Search ................ 285/281, 280, 278, 275

[56] References Cited

U.S. PATENT DOCUMENTS

| | | | |
|---|---|---|---|
| 2,460,872 | 2/1949 | Carpenter | 285/275 X |
| 2,963,304 | 12/1960 | Comlossy, Jr. et al. | 285/281 X |
| 3,392,993 | 7/1968 | Myers | 285/281 X |
| 4,229,024 | 10/1980 | Oberrecht et al. | 285/281 X |
| 4,236,737 | 12/1980 | Herbert et al. | 285/281 X |
| 4,326,736 | 4/1982 | Kusumi et al. | 285/281 X |
| 4,337,970 | 7/1982 | Gunderson | 285/137 X |

Primary Examiner—Thomas J. Callaghan
Attorney, Agent, or Firm—Joseph Januszkiewicz

[57] ABSTRACT

The present invention is directed to swivel means for use in connecting pairs of axially spaced risers in an off-shore multi-line riser system the conveys petroleum from a collection point on the ocean floor to a floating buoy for delivery to tankers. The swivel permits considerable latitude in the movement of the riser system yet assuring leak proof joints at the points of movement by providing elastic seals that facilitate motion between conveying conduits.

4 Claims, 5 Drawing Figures

4,468,056

SWIVEL

BACKGROUND OF THE INVENTION

This invention relates to the riser system of an off-shore production well and more particularly to a new and improved swivel in the riser system.

Upon the completion of off-shore oil wells which include crude oil and gas, it is necessary to provide means for collecting and/or transferring the crude oil to tankers from the collection point of the completed wells. One proposed system for use in deep waters is a multi-line riser system which would include among other equipment a riser base for attachment to the sea floor or ocean floor, a plurality of determinate length risers, supply pipes, universal joints for connecting the risers and mouring buoys or top support buoys along with mechanisms for use in loading the output of the production into storage vessels or ships.

Early in the development of the recovery of crude oil from off-shore production facilities, fixed platforms were used in the recovery system only in shallow waters and as exploration extended into deeper waters, it was important to provide a platform with tension legs as in U.S. Pat. No. 3,934,528. The present invention is directed to the use of rigid columns and risers with a universal joint that couples the several rigid risers to provide an articulated column. A production riser or column is a series of vertically spaced supports interconnected by universal joints with one end of the column of risers connected to rigid or fixed base and the other end of the column of risers connected to a buoy. In use herein, the term "production" refers to a completed well or wells and is directed to the recovery of the crude oil or gas in contrast to the drilling for the crude oil or gas. The base of the risers serves as the collection point for the several wells that are producing. The riser supports a plurality of vertically extending pipe for conveying the oil. The universal joint connects the ends of the adjacent risers permitting articulation therebetween ans also supports the swivels that interconnect the rigid pipes from one riser to rigid pipes of an adjacent riser. The use of rigid flow lines such as pipes depends on the swivel joint to take up all the stresses and forces that are a result of the tremendous operating conditions of wave action, and unusual weather conditions. Flexible hoses are not suited for marine application because of the need for large diameters for transmission of fluids and the ability to withstand high pressures.

The swivel joint of the present invention has sealing means operative under high internal pressures that permits the joint to sustain very high thrust loads due to external forces while at the same time permitting continuous oscillating motions with freedom for rotation that can exceed 360°.

SUMMARY OF THE INVENTION

The present invention contemplates a swivel for use in an off-shore marine environment wherein a pair of axially extending tubular members have a torsional elastic seal captively engaged therebetween. One of the tubular members is bonded to the elastic seal while the other tubular member frictionally engages and compresses the seal against a portion of the one member. Bearing means confine the movement of the elastic seal while axial and radial thrust bearings facilitate motion between the tubular members.

DETAILED DESCRIPTION

Figure 1:
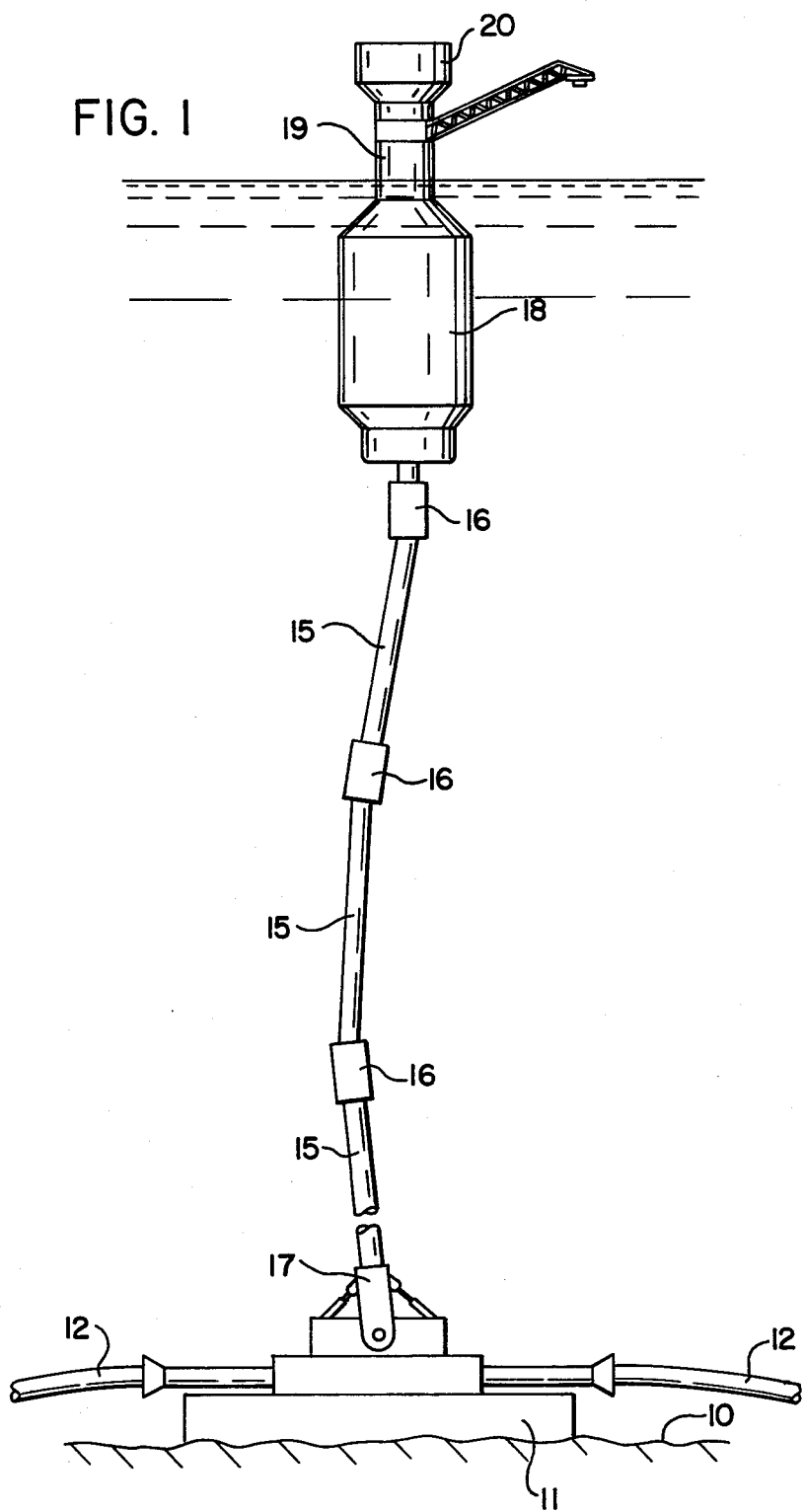
FIG. 1 is a schematic side elevational view of a multi-riser system in a deep water environment.

Referring to the drawings wherein like reference numerals designate like or corresponding parts throughout the several views, there is shown in FIG. 1 a sea-floor 10 to which a base 11 is suitably anchored. The base 11 houses a manifold or storage means for crude oil which is pumped thereto by pipelines 12 from satellite production facilities. A plurality of vertically aligned risers 15 interconnected by universal joints 16 are connected to the base by an articulated joint 17. The uppermost universal joint 16 is connected to a buoy 18 which supports a column 19 and a housing structure 20.

Figure 2:
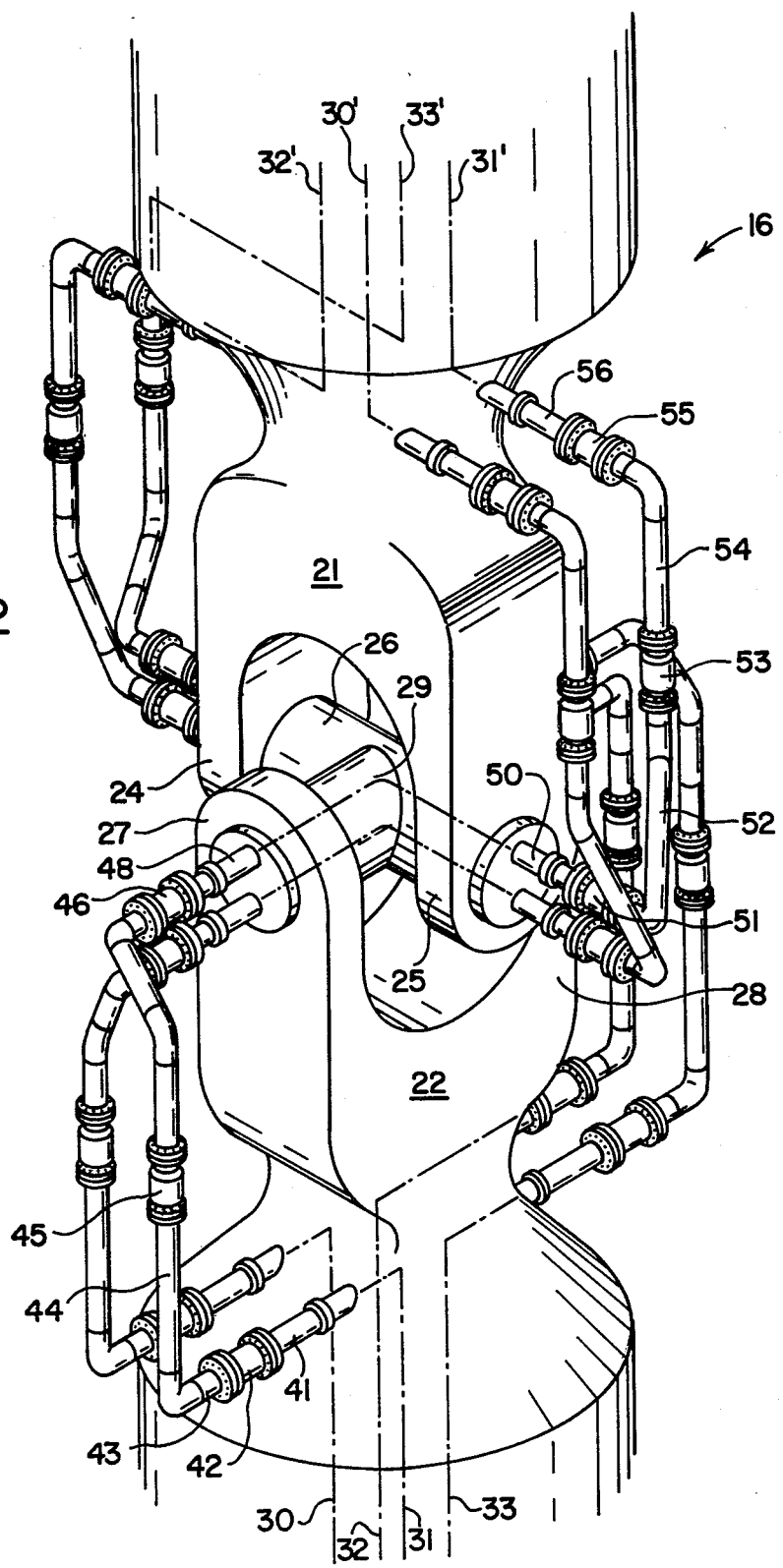
FIG. 2 is an isometric view of a universal joint in the multi-riser system.

As seen in FIG. 2 the universal joint 16 has an upper yoke member 21 and a lower yoke member 22. Yoke member 21 has a pair of depending leg portions 24-25 supporting a laterally extending bearing member 26 therebetween. Yoke member 22 has a pair of upwardly extending leg portions 27-28 supporting a laterally extending bearing member 29. With bearing members 26 and 29 interconnected at their juncture, the respective yoke members 21 and 22 are permitted to pivot at right angles to each other on their respective bearing members about axes that are normal to each other.

Yoke member 22 has a hollow lower portion which is adapted to carry a plurality of conduits vertically therethrough. Only four conduits 30-31-32-33 are shown in FIG. 2 although many more conduits are contemplated. Only four conduits are shown to provide a clearer understanding of the invention. Conduit 31 is connected to a conduit 41, which conduit 41 extends outwardly externally from the yoke 22 for connection to a swivel joint 42. Swivel joint 42 in turn is connected via a vertically extending conduit 43-44 to a slip joint 45, which in turn is connected via suitable conduits to a swivel joint 46, which swivel joint 46 is connected to a conduit 48 that extends through bearing member 29 into bearing member 26 for connection to a horizontally extending conduit 50. Conduit 50 is connected to a swivel joint 51 thence to conduit 52 and slip joint 53. Slip joint 53 permits a limited axial movement between conduit 52 and a conduit 54. Conduit 54 is connected to one end of a swivel joint 55 which in turn is connected to a conduit 56, which conduit 56 extends into yoke member 21 for the conveyance of oil via a conduit 31' to a subsequent conduit through the risers 15 for eventual connection to a storage facilities in the buoy 18 for discharge to a waiting tanker that is moored to support column 19. In a similar manner conduits 30-32-33 in Yoke 22 are connected by conduits, swivels amd slip joints to respective conduits 30'-32'-33' in yoke 21 for eventual connection through suitable conduits through the respective risers 15 to the storage facilities in the buoy 18 for subsequent or immediate unloading to a tanker that is moored to support column 19.

Figure 3:
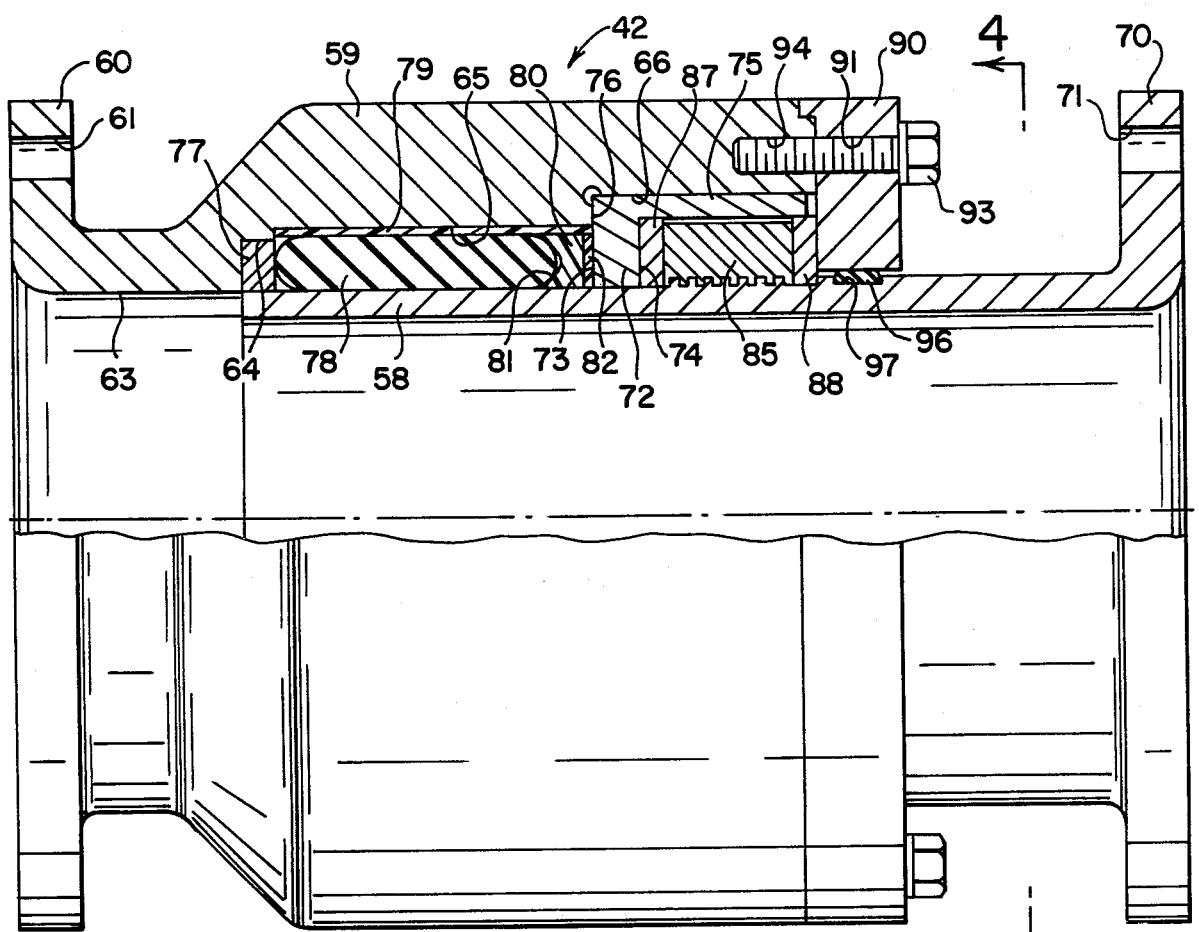
FIG. 3 is a side elevational view of a swivel joint with a portion broken away to show in cross-sectional the interconnected tubular members and their related auxiliary parts.

All of the swivel joints such as joints 42-46-51-55 are similar in construction and only one such swivel joint will be described. Swivel joint 42 (FIG. 3) has an inner tubular member 58 and an outer tubular member or shell 59.

Outer tubular member 59 has an annular or flanged end portion 60 with a plurality of circumferentially spaced bores 61 to provide means for connecting one end of such swivel joint 42 to the adjacent conduit 43. Tubular member 59 has a plurality of stepped bores 63-64-65 and 66 extending inwardly from the flanged end portion 60. The respective bores 63-64-65-66 are succeedingly of larger diameter.

The one end of inner tubular member 58 has an external diameter that permits a sliding fit with bore 63. The other end of tubular member 58 has an annular or flanged end portion 70 with a plurality of circumferentially spaced bores 71. Such flanged end portion 70 provides a convenient means for securing the swivel joint 42 to the adjacent conduit 41. Located on the intermediate portion of inner tubular member 58 is an annular cup-shaped member or sleeve 72 having an outer annular face 73 and an inner annular face 74. The sleeve 72 has an outwardly extending cylindrical portion 75 that is frictionally received by the bore 66 of outer tubular member 59. The annular face 73 of sleeve 72 abuttingly engages a shoulder 76, which shoulder is formed by the annular face between bores 65 and 66. Such sleeve 72 will limit the axial movement of the inner tubular member 58 into outer tubular member 59 in a manner to be described. The one end of tubular member 58 has a radial bearing 77 that frictionally engages the peripheral surface of bore 64.

A ring 78 of elastomeric material suitable for service exposure to both lubricating oils and sea water is bonded or similarly suitably secured to the outer peripheral surface of inner tubular member 58 closely adjacent the one end thereof.

The term elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials. Published by the American Society for Testing Materials).

The elastomeric or rubber materials that can be used include natural rubber copolymers of butadiene and acrylonitrile, copolymers of butadiene and styrene, copolymers of butadiene and alkyl acrylates, butyl rubber, olefin rubbers such as ethylene-propylene and EPDM rubber, flurocarbon rubbers, flurosilicone rubbers, silicone rubbers, chlorosulfonated polyethylene, polyacrylates, polybutadiene, polychloroprene and the like.

Preferred elastomeric materials include natural rubber, copolymers of butadiene/acrylonitrile and copolymers of butadiene and styrene which is often referred to as SBR.

Figure 5:
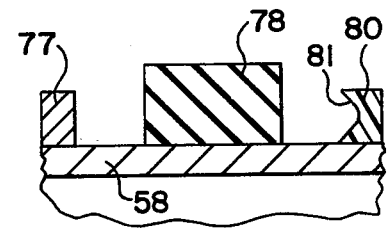
FIG. 5 is a fragmentary section view of the torsilastic seal in the relaxed condition prior to assembly.
Figure 4:
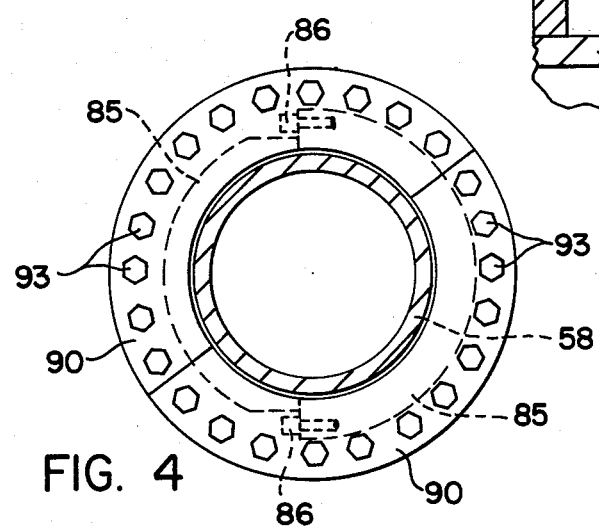
FIG. 4 is an end view of the end cap of a swivel joint.

Such elastomeric ring 78 of inner tubular member 58 is under compression when assemblied within outer tubular member 59. Prior to assembling the swivel joint, such ring 78 expands radially in the normal uncompressed condition such that there is substantial clearance space to either side of ring 78 on tubular member 58 as seen in FIG. 5. An annular ring or seal 79 made of a material such as from polytetrafluoroethylene is suitably secured as by bonding to the inner peripheral surface of bore 65 of outer tubular member 59. In the compressed state of elastomeric ring 78, the outer surface thereof comes into frictional contact with the seal 79. An annular back up ring 80 is mounted on the outer peripheral surface of inner tubular member 58 closely adjacent the bottom end of sleeve 72 and in contact with the face 73 thereon. The one annular face 81 of ring 80 is arcuately grooved or shaped to frictionally engage the laterally extending compressed side edge of elastomeric ring 78. Back up ring 80 is preferably made from a ultra high molecular weight polyethylene material. A second back up ring 82 may be interposed between ring 80 and sleeve 72 to provide greater axial strength to the ring 80; however, back up ring 82 may be eliminated and thus ring 80 would abuttingly engage the face 73 on sleeve 72. The width of ring 80 is proportioned to fill the gap between sleeve 72 and ring 78. The outer periphery of innner tubular member 58 that is between the one end of sleeve 72 and the flange portion 70 is serrated receiving an axial thrust split collar 85 interconnected by screws 86. Mounted to the respective sides of the collar 85 are radial and axial thrust bearings 87 and 88. An annular split flange 90 with a plurality of circumferentially spaced bores 91 is abuttingly located on the one end of the outer tubular member 59 and interconnected thereto by a plurality of bolts 93 threaded into threaded bores 94 circumferentially spaced around tubular member 59. An annular seal 96 located in an annular groove 97 adjacent bearing 88 frictionally engages the inner periphery of the split flange or retainer 90 to seal out foreign liquids. The flange 90 also abuttingly engages bearing 88.

In the operation of the swivel 42 which permits relative rotation between conduits 41 and 43 on off-centerlines of adjacent risers 15, outer tubular member 59 and inner tubular member 58 have axially aligned and axially spaced annular bearings 77, 87 and 88, which handle the radial forces while axially spaced bearings 87 and 88 also handling the thrust forces. Sleeve 75 is captively engaged between bearing 87 and outer member 59 to transmit the axial thrust forces therethrough. As the respective inner and outer tubular members 58 and 59 oscillate relative to each other in small increments the annular elastomeric seal 78 absorbs any torsional elastic deformation and small angular deflections. The torsional seal 78 upon encountering large deflections or relative rotational stresses between the inner and outer tubular member 58 and 59 will move or slide relative to the antifriction layer or seal 79. Since the inner surface of elastomeric ring 78 is bonded to the outer surface of tubular member 58 such seal 78 will move with tubular member 58 while the outer peripheral surface of torsion seal 78 will slide on sleeve or seal 79 while maintaining a fluid tight seal under extreme internal flow pressures. The elastomeric or rubber torsion seal 78 will wind up torsionally until the torque in the rubber equals the frictional torque exerted by the polytetrafluoroethylene material 79. At this point, the rubber will slip on the surface of the polytetrafluoroethylene material. The arcuately shaped groove 81 in the back up ring 80 abuttingly engages the one buldged end of the torsion seal 78 to prevent any axial flow or displacement, while annular radial bearing 77 in the other end of torsion seal 78 can function in a similar manner. The seal 96 which is adhered to the bottom of groove 97 in tubular member 58 seals the thrust bearing chamber wherein bearings 87 and 88 are located. To facilitate the rotational frictional engagement of seal 96 on the inner peripheral surface of flange 90, a layer of polytetrafluoroethylene may be adhered to such inner peripheral surface of flange 90.

We claim:

1. A swivel joint for use in connecting a pair of axially spaced risers that are subjected to torsional twisting forces, each of said risers having a plurality of conduits, swivel means interconnecting conduits in one riser to conduits in an adjacent riser, said swivel means being located off-center of said risers, each of said swivel means having an outer tubular member and an inner tubular member, the inner bore of said outer tubular member having at least a pair of stepped bores defining an annular shoulder therebetween, a flanged sleeve abuttingly contacting said annular shoulder, one of said stepped bores cooperative with one end of said inner tubular member and said sleeve to define a first chamber, the inner periphery of said one stepped bore of said outer tubular member has an annular ring bonded thereto, said annular ring being made of an antifriction material, said one end of said inner tubular member having a pair of axially spaced annular bearings, an annular sealing member of elastically deformable material in compression having an inner face bonded to the outer periphery adjacent to said one end of said inner tubular member and having an outer surface frictionally engaging said annular ring for relative rotation therebetween, said annular sealing member operative under load to contact said pair of spaced annular bearings, trust bearing means mounted on the other end of said inner tubular member, a retainer mounted on one end of said outer tubular member and abuttingly contacting said thrust bearing means on said inner tubular member, and said thrust bearing means is captively held in an axial direction by said flanged sleeve and said retainer on said inner tubular member.

2. A swivel joint as set forth in claim 1 wherein said thrust bearing means includes an annular collar securely mounted on the other end of said inner tubular member with axially spaced thrust bearings mounted on the respective sides of said annular collar.

3. A swivel joint as set forth in claim 2 wherein said annular sealing member is a ring of elastomeric material and said antifriction material is a ring of material chosen from a group consisting of a polytetrafluoroethylene material, and said inner tubular member has a circumferential groove opposite said retainer that houses an annular seal.

4. A swivel joint for interconnecting two axially spaced conduits that have oscillating and rotary movement therebetween, said joint having an outer tubular member and an inner tubular member adapted to be connected to separate conduits, said outer tubular member having a bore therethrough, the intermediate bore portion of said outer tubular member has an antifriction material bonded thereon, said inner member having an annular collar connected to the intermediate outer periphery thereof, a pair of axially spaced and axially aligned annular bearings abuttingly contacting opposite side of said collar, a flanged sleeve captively held by said outer tubular member and said inner tubular members, said flanged portion abuttingly contacting one of said bearings, an annular sealing member of elastically deformable material having an inner surface bonded to the outer periphery adjacent to one end of said inner tubular member, the outer peripheral surface of said annular sealing member frictionally engages the surface of said antifriction material on said bore of said outer tubular member in radial compression to provide a seal therebetween but permitting rotation, a retainer mounted on one end of said outer tubular member abuttingly contacting said inner tubular member and one of said aligned annular bearings, said flanged sleeve abuttingly contacts the other one of said aligned annular bearings, and said ring of elastomeric material has its respective opposite sides abuttingly contacted by axially spaced bearing means mounted on said one end of said inner tubular member to confine said annular sealing member.

* * * * *